United States Patent
Hakura et al.

(10) Patent No.: US 10,055,806 B2
(45) Date of Patent: *Aug. 21, 2018

(54) TECHNIQUES FOR MAINTAINING ATOMICITY AND ORDERING FOR PIXEL SHADER OPERATIONS

(71) Applicant: NVIDIA CORPORATION, Santa Clara, CA (US)

(72) Inventors: Ziyad Hakura, San Jose, CA (US); Eric Lum, San Jose, CA (US); Dale Kirkland, Madison, AL (US); Jack Choquette, Palo Alto, CA (US); Patrick R. Brown, Wake Forest, NC (US); Yury Y. Uralsky, Santa Clara, CA (US); Jeffrey Bolz, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/924,618

(22) Filed: Oct. 27, 2015

(65) Prior Publication Data

US 2017/0116698 A1    Apr. 27, 2017

(51) Int. Cl.
*G06T 1/20*   (2006.01)
*G06T 1/60*   (2006.01)

(52) U.S. Cl.
CPC . *G06T 1/20* (2013.01); *G06T 1/60* (2013.01)

(58) Field of Classification Search
CPC .................................. G06T 1/20; G06T 1/60
See application file for complete search history.

(56) References Cited

U.S. PATENT DOCUMENTS

| | | | |
|---|---|---|---|
| 6,195,106 B1* | 2/2001 | Deering | G06T 15/005 345/519 |
| 8,130,223 B1* | 3/2012 | Danskin | G06T 1/60 345/422 |
| 2013/0141445 A1* | 6/2013 | Engh-Halstvedt | G06T 5/002 345/506 |
| 2016/0307365 A1* | 10/2016 | Liao | G06T 1/20 |

\* cited by examiner

*Primary Examiner* — Tapas Mazumder
(74) *Attorney, Agent, or Firm* — Artegis Law Group, LLP

(57) ABSTRACT

A tile coalescer within a graphics processing pipeline coalesces coverage data into tiles. The coverage data indicates, for a set of XY positions, whether a graphics primitive covers those XY positions. The tile indicates, for a larger set of XY positions, whether one or more graphics primitives cover those XY positions. The tile coalescer includes coverage data in the tile only once for each XY position, thereby allowing the API ordering of the graphics primitives covering each XY position to be preserved. The tile is then distributed to a set of streaming multiprocessors for shading and blending operations. The different streaming multiprocessors execute thread groups to process the tile. In doing so, those thread groups may perform read-modify-write operations with data stored in memory. Each such thread group is scheduled to execute via atomic operations, and according to the API order of the associated graphics primitives.

22 Claims, 16 Drawing Sheets

TECHNIQUES FOR MAINTAINING ATOMICITY AND ORDERING FOR PIXEL SHADER OPERATIONS

BACKGROUND OF THE INVENTION

Field of the Invention

Embodiments of the present invention relate generally to graphics processing and, more particularly, to techniques for maintaining atomicity and ordering for pixel shader operations.

Description of the Related Art

A conventional graphics pipeline typically includes a programmable pixel shader configured to execute various pixel shader programs on graphics primitives to generate color data for pixels. These operations generally do not maintain application programming interface (API) order, because doing so is typically unnecessary for pixel shading operations. Conversely, when performing pixel blending operations, API order should be maintained to reflect the order with which geometry appears within the scene being rendered. Thus, pixel blending operations are not performed by the pixel shader. Instead, pixel blending operations are typically performed in the raster operations processor (ROP). These units are usually configured to perform basic blending operations and to maintain API order when performing those blending operations.

Conventional ROPs are fixed-function hardware units that operate with speed, but with limited functionality. Generally, ROPs cannot be programmed the same way a pixel shader can be programmed. Consequently, the types of basic blending operations available via the ROP are inherently limited to those operations the ROP can be pre-programmed to perform.

In sum, conventional pixel shaders are capable of performing programmable shading operations, but lack the capacity to maintain API order for graphics primitives being processed. Conversely, conventional ROPs are capable of maintaining API order for graphics primitives, although cannot perform programmable operations.

As the foregoing illustrates, what is needed are techniques for performing programmable blending operations in a graphics processing pipeline while maintaining API ordering.

SUMMARY OF THE INVENTION

One embodiment of the present invention sets forth a graphics subsystem configured to generate tiles of coverage samples, including a first bin configured to collect arrays of coverage samples associated with a first range of X-Y values, and a tile engine coupled to the first bin and configured to drain a first array of coverage samples from the first bin, compare the first array of coverage samples to a tile mask to determine that a first tile does not yet include a coverage sample at a first X-Y position, and insert a first coverage sample included in the first array of coverage samples into the first tile.

At least one advantage of the disclosed technique is that a graphics processing pipeline can be configured to perform operations that rely on atomicity and API order, such as blending operations. Thus, the graphics processing pipeline need not be limited by fixed-function blending hardware.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
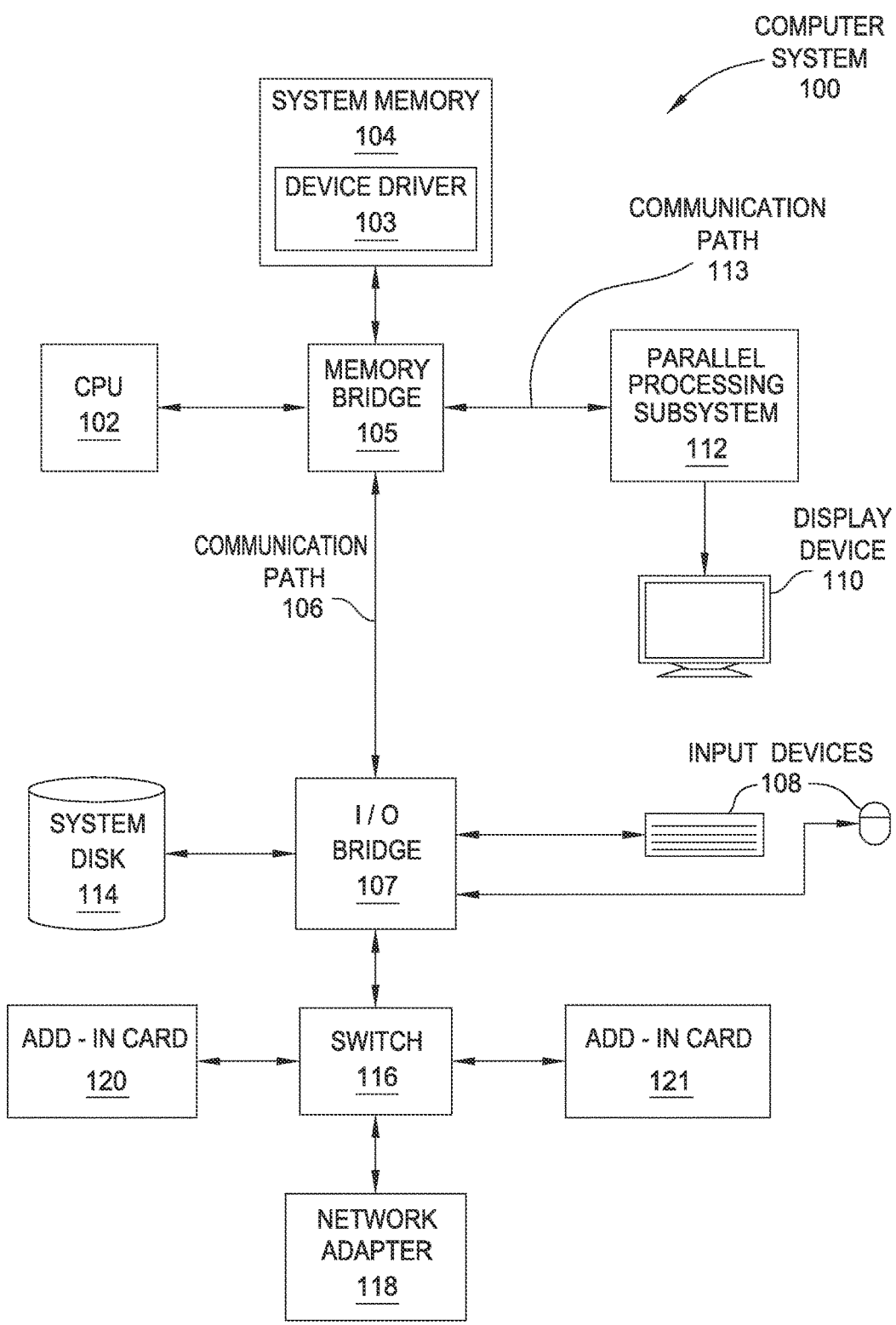
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
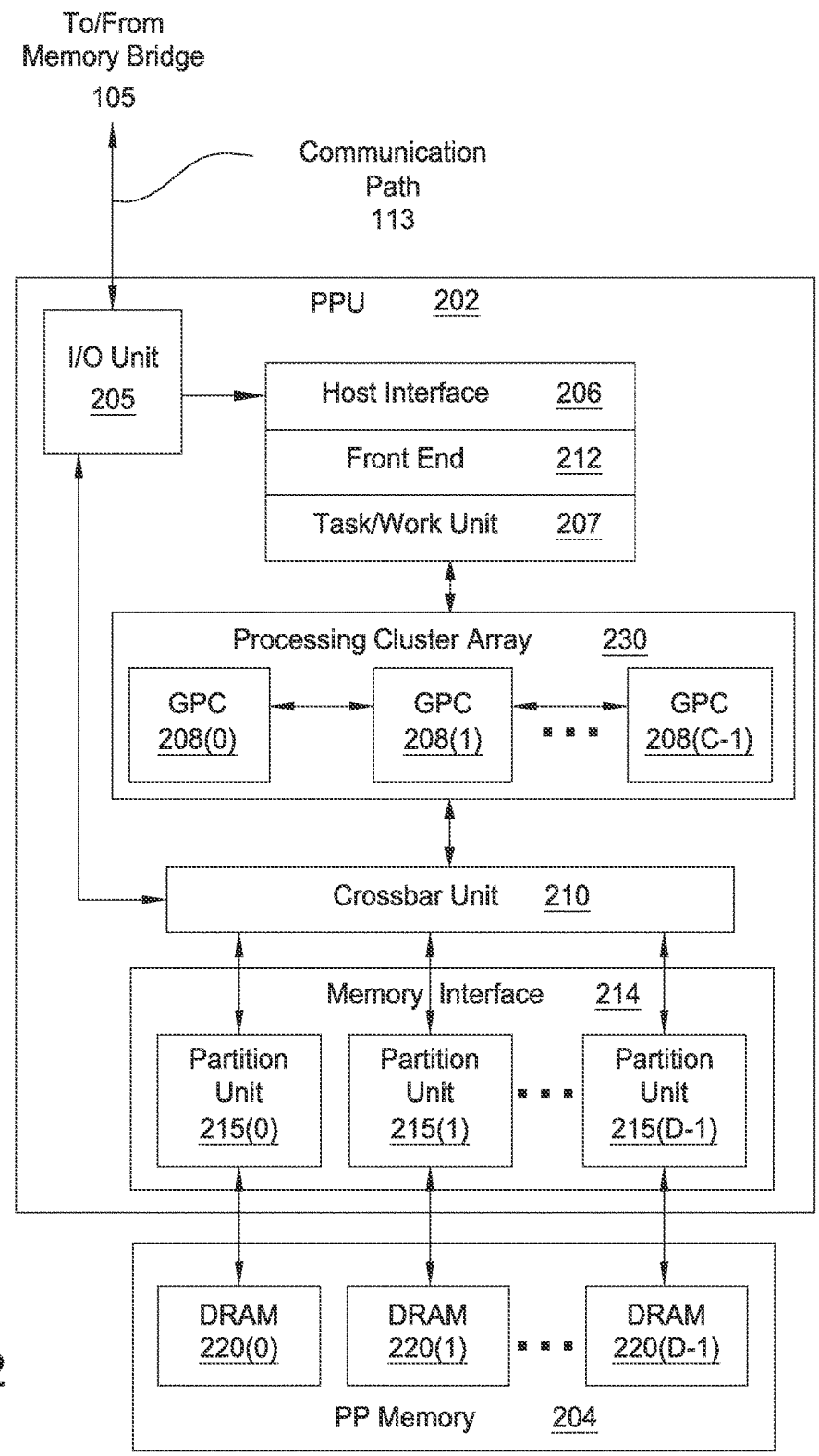
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
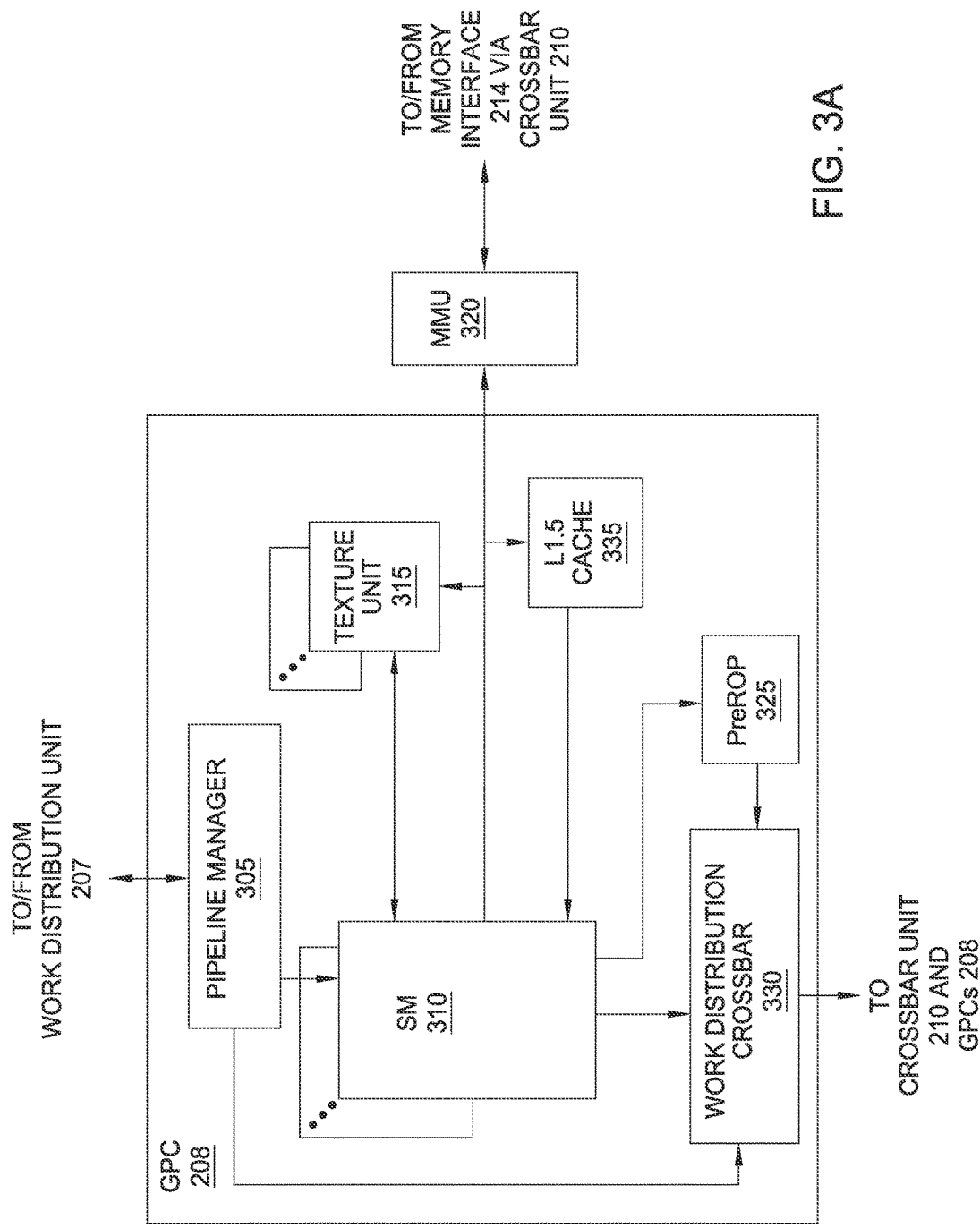
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
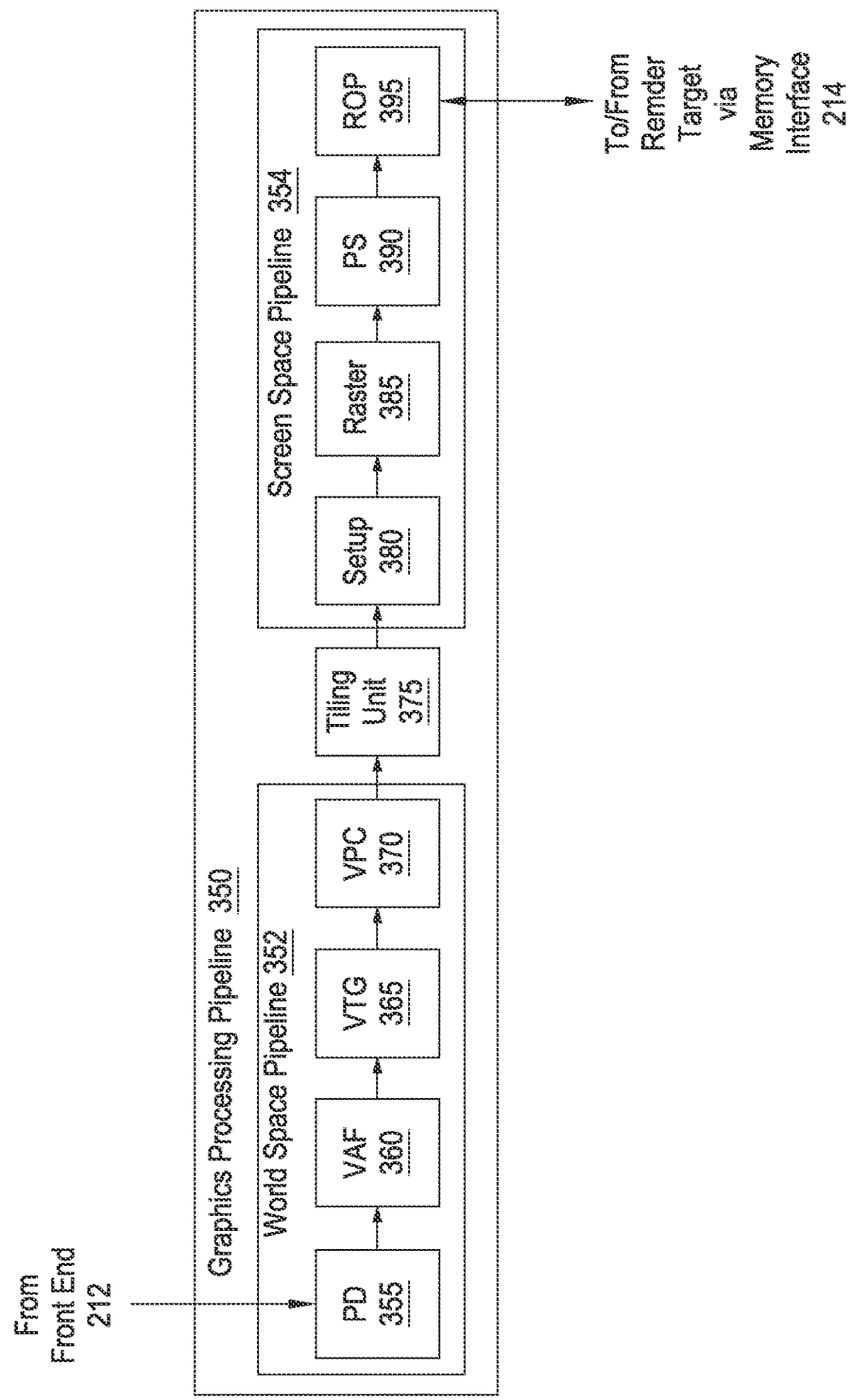
FIG. 3B is a conceptual illustration of a graphics processing pipeline that may be implemented within the parallel processing unit of FIG. 2, according to one embodiment of the present invention.

FIG. 3B is a conceptual illustration of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 390 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In certain embodiments, the screen space pipeline 354 described above may be configured to process graphics primitives such that API order is preserved with respect to those primitives. Further, the screen space pipeline 354 may also be configured to preserve atomicity in performing memory access operations involving those primitives. By maintaining both API order and atomicity, screen space pipeline 354 can be configured to perform programmable blending operations that involve read-modify-write memory operations. Such blending operations may be more complex than possible with prior art approaches that relied on the fixed-function ROP unit for pixel blending.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

As used herein, references to shared memory may include any one or more technically feasible memories, including, without limitation, a local memory shared by one or more SMs 310, or a memory accessible via the memory interface 214, such as a cache memory, parallel processing memory 204, or system memory 104. As also used herein, references to cache memory may include any one or more technically feasible memories, including, without limitation, an L1 cache, an L1.5 cache, and the L2 caches.

Tiled Caching

Figure 4:
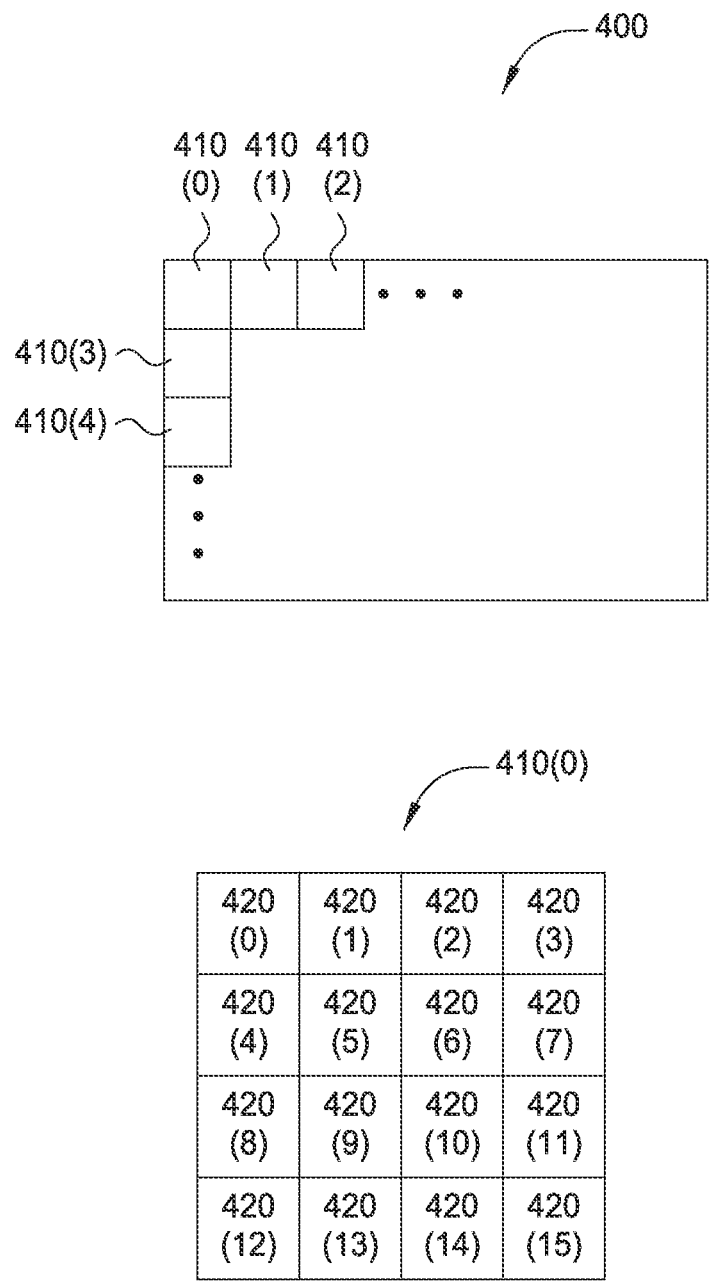
FIG. 4 is a conceptual illustration of a cache tile that the graphics processing pipeline of FIG. 3B may be configured to generate and process, according to one embodiment of the present invention.

FIG. 4 is a conceptual illustration of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Maintaining Ordering and Atomicity for Pixel Shader Operations

Figure 5:
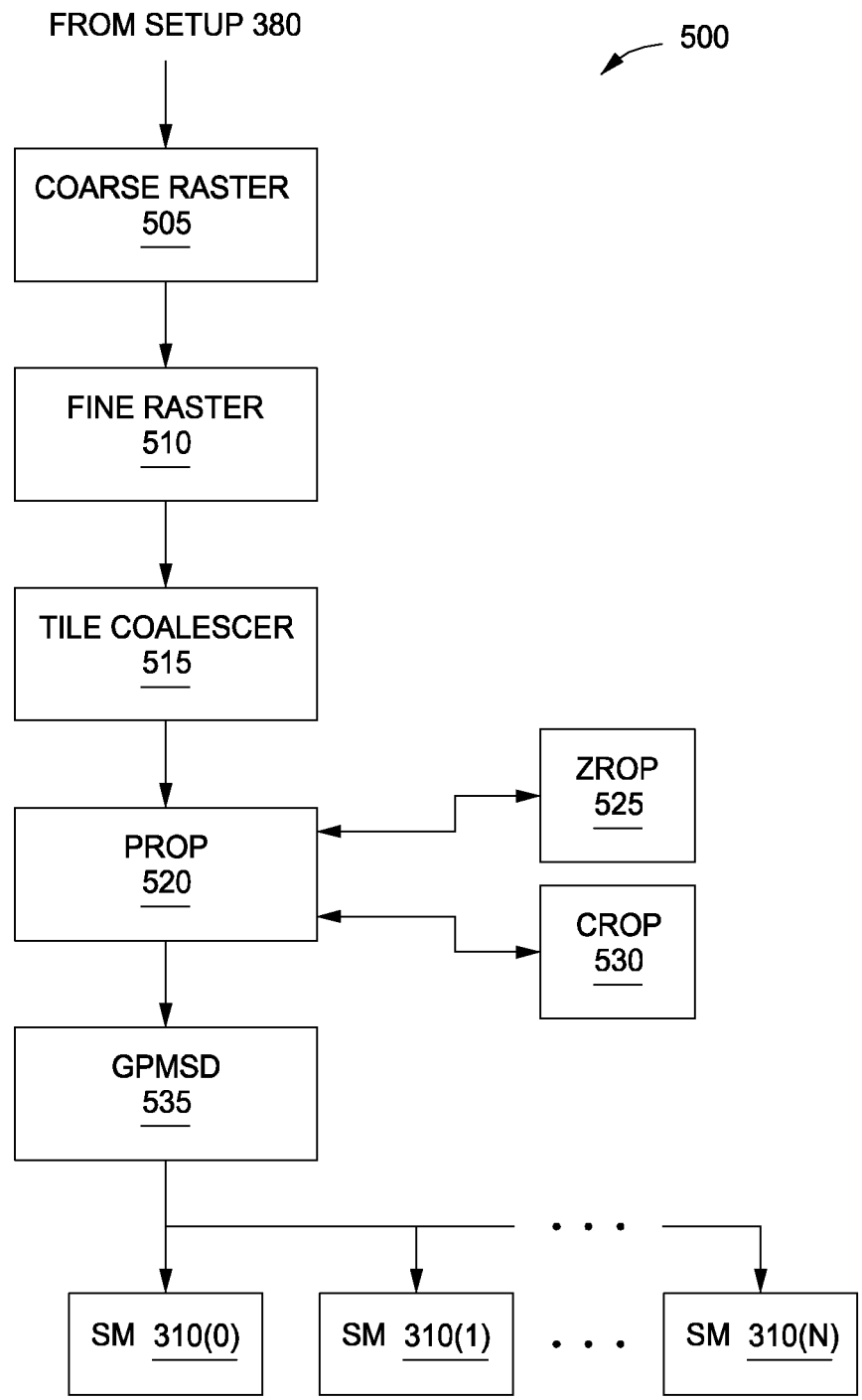
FIG. 5 is a conceptual illustration of a portion of the graphics processing pipeline of FIG. 3B, according to one embodiment of the present invention.

FIG. 5 is a conceptual illustration of a portion of the graphics processing pipeline of FIG. 3B, according to one embodiment of the present invention. As shown, portion 500 of graphics processing pipeline 350 includes a coarse raster 505, a fine raster 510, a tile coalescer 515, a pre-ROP (PROP) 520, a ZROP 525, a CROP 530, and a GPMSD 535 coupled to a plurality of SMs 310(0) through 310(N). In one embodiment, coarse raster 505 and fine raster 510 may be included in raster 385, tile coalescer 515 may be included within PS 390, and PROP 520, ZROP 525, and CROP 530 may be included in ROP 395.

Figure 6:
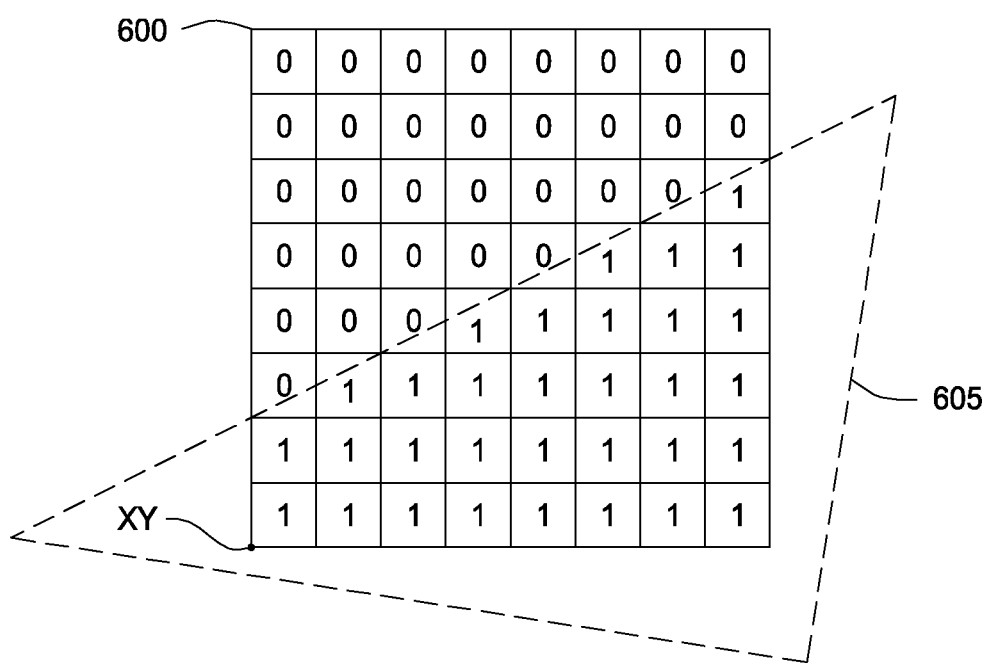
FIG. 6 is a conceptual illustration of a fine raster transaction that is processed in the portion of the graphics processing pipeline shown in FIG. 5, according to one embodiment of the present invention.

In operation, coarse raster 505 receives graphics primitives from setup 380, in API order, and performs coarse rasterization operations with the received primitives. Coarse raster 505 then passes the coarse rasterization results to fine raster 510. Those results could include coarse coverage data, among other types of data. Fine raster 510 then performs a more finely grained rasterization with the received coarse rasterization results. In doing so, fine raster 510 generates a plurality of "fine raster transactions," each of which includes coverage data associated with a specific region of the screen space. The coverage data corresponds to a set of primitives that cover the screen space region (or portions thereof). FIG. 6 illustrates a fine raster transaction in greater detail.

FIG. 6 is a conceptual illustration of a fine raster transaction that is processed in the portion of the graphics processing pipeline portion shown in FIG. 5, according to one embodiment of the present invention. As shown, fine raster transaction 600 includes a plurality of coverage samples. Each coverage sample corresponds to a different XY position within the screen space. Thus, fine raster transaction 600 reflects coverage data associated with a range of XY positions in the screen space. A given coverage sample indicates whether a graphics primitive covers the corresponding XY position of screen space. For example, graphics primitive 605 partially covers a portion of the screen space associated with fine raster transaction 600. Accordingly, the coverage samples associated with XY positions that are covered by primitive 605 are set to "1," while the other coverage sample are set to "0."

Fine raster transaction 600 is illustrated as an 8×8 array of coverage samples, although those skilled in the art will recognize that these dimensions are exemplary in nature and not meant to be limiting. In one embodiment, each coverage sample of fine raster transaction 600 corresponds to a pixel having a specific XY position within the screen space. In another embodiment, each coverage sample of fine raster transaction 600 corresponds to a pixel sample having a specific XY position within the screen space. As a general matter, the techniques discussed herein are applicable to both pixels and to pixel samples.

Referring back now to FIG. 5, tile coalescer 515 is configured to receive a stream of fine raster transactions from fine raster 510, in API order, and to then coalesce these transactions into "tile coalescer (TC) tiles." A TC tile includes coverage samples from a larger region of the screen space than a fine raster transaction. For example, a plurality of 8×8 fine raster transactions, such as the one shown in FIG. 6, could be coalesced within tile coalescer 515 into a 16×16 TC tile. The 16×16 TC tile would thus represent coverage data associated with a 16×16 region of pixels (or samples) of screen space. Again, the dimensions discussed herein are exemplary and not meant to limit the scope of the invention.

Tile coalescer 515 is configured to generate TC tiles based on fine raster transactions in a manner that obeys the API ordering of the associated graphics primitives. In doing so, tile coalescer 515 distributes coverage samples for the same XY screen space position across multiple TC tiles. A sequence of TC tiles generated in this fashion includes coverage samples that remain in API order. This functionality allows programmable blending operations to be performed. Tile coalescer 515 is described in greater detail below in conjunction with FIGS. 7-9.

Tile coalescer 515 outputs TC tiles to PROP 520. PROP 520 performs pre-shading functionality, and, in doing so, may employ ZROP 525. PROP 535 outputs processed TC tiles to GPMSD 535. GPMSD 535 is a thread management unit that is configured to assign thread groups (or warps) for processing the TC tiles, and to distribute those thread groups to SMs 310(0) through 310(N). The processing of a TC tile may include pixel shading and/or pixel blending operations. GPMSD 535 distributes the thread groups assigned to a TC tile across SMs 310 by implementing a technique that preserves API ordering for each such tile. This technique is described in greater detail below in conjunction with FIGS. 10-14.

SMs 310 receive the TC tiles and associated thread groups, and then execute those thread groups in API order. In doing so, SMs 310 may perform various shading and/or blending programs to generate pixel (or sample) data. Each SM 310 executes such programs using a set of execution units and load-store units, as discussed above in conjunction with FIG. 3A. The load-store units within a given SM 310 perform atomic memory access operations to write and/or read pixel (or sample) data to and/or from the frame buffer in PP memory 204. Thus, each TC tile may be processed according to the API order of the associated graphics primitives, and with atomicity preserved, thereby permitting programmable blending operations to be performed. In one embodiment, the various programmable shading and/or blending programs are executed in conjunction with the operation of PS 390.

Figure 7:
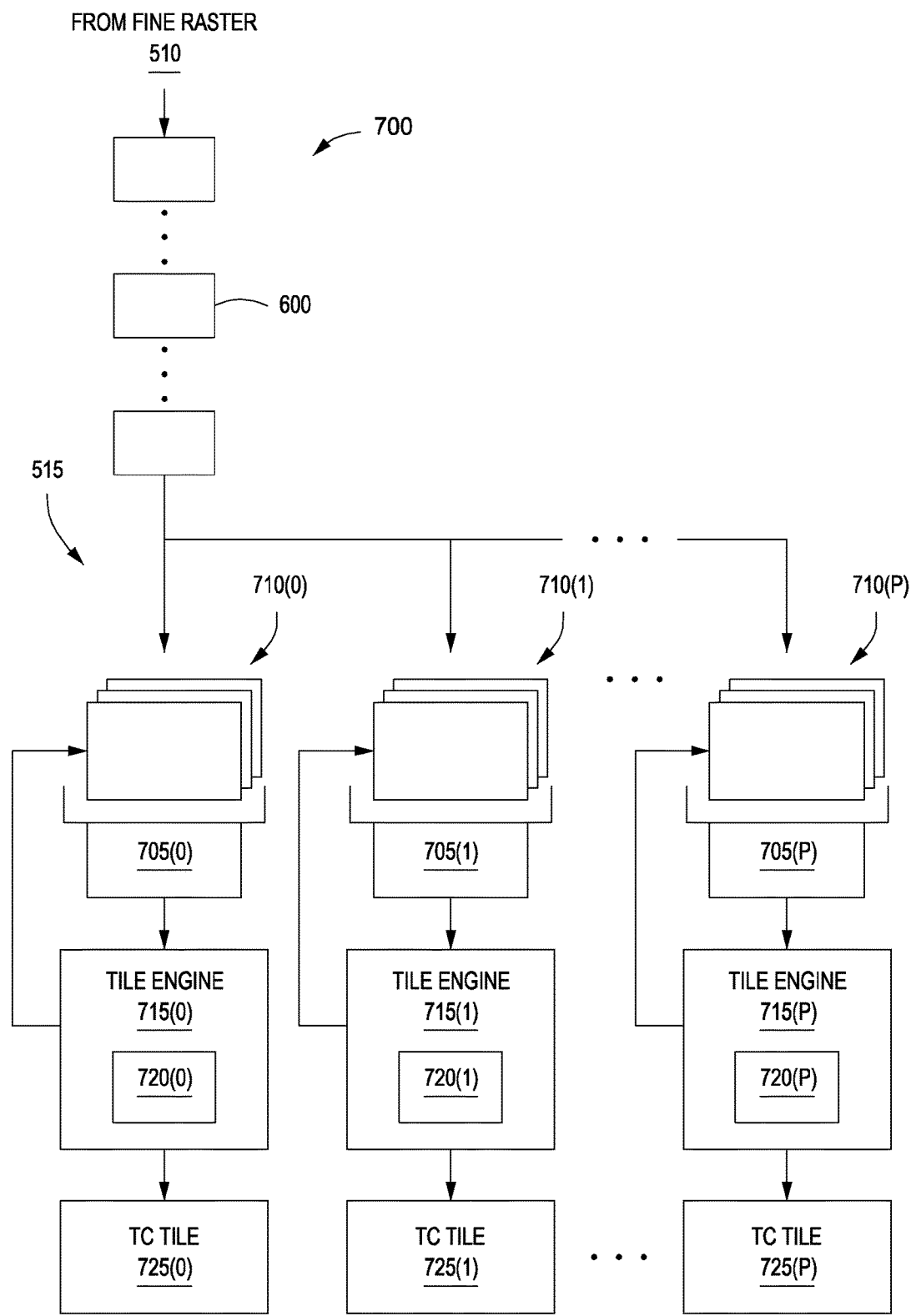
FIG. 7 is a more detailed illustration of the tile coalescer of FIG. 5 processing a stream of fine raster transactions, according to one embodiment of the present invention.

FIG. 7 is a conceptual illustration of the tile coalescer of FIG. 5 processing a stream of fine raster transactions, according to one embodiment of the present invention. As shown, tile coalescer 515 includes a plurality of bins 705 configured to collect different sets 710 of fine raster transactions. Bins 705 are coupled respectively to tile engines 715. Each tile engines 715 includes a tile mask 720 and is configured to generate a TC tile 725.

In operation, tile coalescer 515 receives a stream 700 of fine raster transactions from fine raster 510 of FIG. 5. Stream 700 could include, for example, fine raster transaction 600 of FIG. 6. Tile coalescer 515 then distributes the received fine raster transactions to bins 705. Each bin 705 is configured to buffer fine raster transactions associated with a different region of the screen space. For a given bin 705, the corresponding region of screen space is generally larger than the size of a fine raster transaction. For example, when buffering 8×8 fine raster transactions, the bin 705 would buffer all 8×8 fine raster transactions falling within a particular 16×16 region of screen space. The tile engine 715 coupled to that bin 705 would then generate a 16×16 TC tile 725 by coalescing some or all of those 8×8 fine raster transactions. The exemplary dimensions set forth above may refer to XY dimensions of pixels or samples.

A given fine raster transaction within a bin 705 could reside adjacent in screen space to other fine raster transactions in the bin 705. Additionally, a given fine raster transaction within the bin 705 could also reside at the same screen space position as other fine raster transactions in the bin 705. The latter case may occur when multiple primitives cover the same XY screen space position(s). For example, if two triangles cover a particular XY position, then two different fine raster transactions would separately include coverage data for the two primitives, including different coverage samples for the aforesaid XY position. Tile coalescer 515 would collect those two fine raster transactions into the same bin 705.

When a bin 705 becomes full, meaning that the set 710 of fine raster transactions becomes sufficiently large, the corresponding tile engine 715 begins draining the buffered fine raster transactions. In one embodiment, a shared tile engine 715 performs the functionality described herein relative to all bins 705. The tile engine 715 processes each fine raster transaction to determine whether those transactions should be included in the TC tile 725 being generated. In order to preserve API order, the tile engine 715 avoids including fine raster transactions associated with the same XY position(s) in the same TC tile 725. Such fine raster transactions are referred to herein as "conflicting." To mitigate conflicts between fine raster transactions, the tile engine 715 distributes the coverage samples associated with conflicting fine raster transactions across different TC tiles 725. The motivation for this functionality is explained, by way of example, below.

Returning now to the previous example, suppose a given bin 705 includes two fine raster transactions derived from two different primitives that cover the same XY position. To maintain API order, those transactions would need to be processed according to the API ordering of the associated primitives. However, if the two transactions were included in the same TC tile 725, when the TC tile 725 is later processed by an SM 310, due to the parallel processing nature of SMs 310, those transactions may be processed in any conceivable order. Consequently, the API order of the associated primitives could be violated.

To avoid this situation, tile engines 715 recirculate fine raster transactions that have been drained when a conflict is detected with the current TC tile 725. To do so, each tile engine 715 maintains a tile mask 720 that indicates, for the TC tile 725 being generated, the particular XY positions for which the TC tile 725 already includes coverage data. In one embodiment, the tile mask 720 is an array of bit fields and has similar dimensions to the TC tile 725. When a tile engine 715 drains a fine raster transaction, the tile engine 715 compares the fine raster transaction to the tile mask 720 to identify potential conflicts with the TC tile 725 being generated. If the comparison to the tile mask 720 indicates that no conflicts are present, meaning that the current TC tile does not include any coverage data for the XY positions associated with the fine raster transaction, then the tile engine 715 includes that transaction in the TC tile 725.

Alternatively, if the comparison to the tile mask 720 indicates that conflicts are present, meaning that the current TC tile 725 already includes coverage data for the XY positions associated with that transaction, then the tile engine 715 recirculates the fine raster transaction. In doing so, the tile engine 715 returns that transaction to the bin 705 for processing in conjunction with a subsequent TC tile 725. With this approach, each tile engine 715 can delay the processing of specific fine raster transactions that cause conflicts, thereby preserving API order.

Each tile engine 715 may also be configured to divide fine raster transactions into conflicting coverage samples and non-conflicting coverage samples, and then only recirculate the conflicting portions. For example, a given tile engine 715 could generate, from a first fine raster transaction, a second fine raster transaction that includes conflicting coverage samples, and a third fine raster transaction that includes non-conflicting coverage samples. The second fine raster transaction would be recirculated into the bin 705, while the third fine raster transaction would be included in the TC tile 725.

Once a tile engine 715 determines whether a fine faster transaction (or portion thereof) should be recirculated or included in the TC tile 725, the tile engine 715 may then update the tile mask 720. In some embodiments, the tile engine 715 need only update the tile mask 720 to reflect coverage samples that have been included in the TC tile 725. In particular, in embodiments where the tile engine 715 can divide fine raster transactions with arbitrary granularity (e.g., along coverage sample boundaries), then the tile mask 720 need not reflect coverage samples that have been recirculated. In these embodiments, the tile engine 715 updates the tile mask 720 by performing an OR operation between the tile mask 720 and the fine raster transactions included in the TC tile 725.

However, in other embodiments, the tile engine 715 also updates the tile mask 720 to reflect coverage samples that have been recirculated. In doing so, the tile engine 715 may also perform the aforesaid OR operation between the tile mask 720 and the recirculated fine raster transactions. This functionality may be needed in embodiments where the tile engine 715 can only divide fine raster transactions along quad boundaries (as opposed to coverage sample boundaries). For example, when SMs 310 process quads as the smallest unit of work, quads may not be divisible. The embodiments discussed herein are also described in greater detail below in conjunction with FIG. 8.

Figure 8:
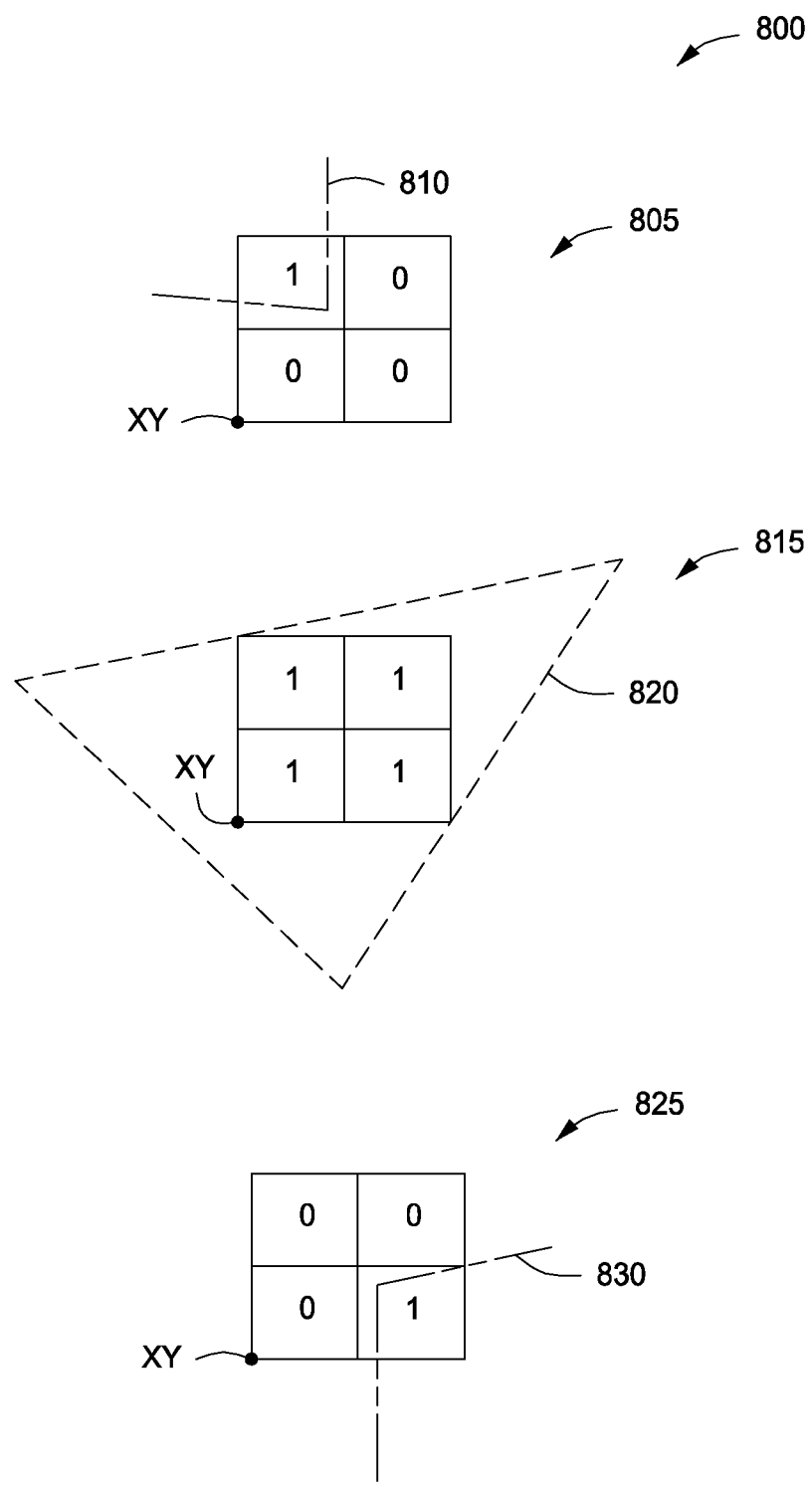
FIG. 8 is a conceptual illustration of a sequence of pixel quads that have coverage conflicts relative to one another, according to one embodiment of the present invention.

FIG. 8 is a conceptual illustration of a sequence of quads that have coverage conflicts relative to one another, according to one embodiment of the present invention. As shown, sequence 800 of quads includes quad 805, quad 815, and quad 825. Quad 805 is partially covered by a primitive 810, quad 815 is completely covered by primitive 820, and quad 825 is partially covered by primitive 830. Primitives 810, 820, and 830 have a specific API ordering which dictates the order with which quads 805, 815, and 825 should be processed. However, that API ordering can potentially be disrupted for specific sequences of quads, such as sequence 800.

For example, suppose a tile engine 715 receives quad 805 (i.e., within a fine raster transaction). The tile engine 715 could include quad 805 in a TC tile 725 and then update the tile mask 720 to reflect the upper left hand coverage sample within that quad. The tile engine 715 then receives quad 815, and compares that quad to the tile mask 720. A conflict is detected at the upper left hand coverage sample, and so quad 815 is recirculated. Again, in this example, quads cannot be divided across quad boundaries and so the non-conflicting coverage samples of quad 815 cannot be separated from the conflicting coverage samples.

The tile engine 715 then receives quad 825 and compares that quad to the tile mask 720. Unless the tile engine 715 updates the tile mask 720 to reflect recirculated coverage samples, the tile engine 715 will not detect a conflict between quad 825 and the TC tile 725. In particular, the upper left hand coverage sample of quad 825, which does not indicate coverage, does not conflict with the upper left hand coverage sample of quad 805, which does indicates coverage. Thus, quads 805 and 825 could potentially be included in the same TC tile 725 and then processed later. However, quad 815 was recirculated for inclusion into a subsequent TC tile 725, and therefore, in this example, the API ordering of those quads has been disrupted.

To avoid this type of scenario, the tile engine 715 is configured to update the tile mask 720 to reflect recirculated coverage samples. Thus, in the above example, the tile engine 715 could update the tile mask 720 to reflect all four coverage samples of quad 815 upon that quad being recirculated. Then, when quad 825 is processed, a conflict would be detected at the lower right hand coverage sample of quad 825. Then, quad 825 would be recirculated as well.

Again, this functionality is only needed in scenarios where fine raster transactions cannot be divided across quad boundaries. In FIG. 8, if the quads in stream 800 could be divided across sample boundaries, then all coverage samples of quad 815, except for the upper left hand coverage sample, could be included in the TC tile 725. The tile mask 720 could be updated to reflect these coverage samples. Then, a conflict would be detected in quad 825, and that quad would be recirculated, preserving API order.

Referring back now to FIG. 7, the tile engine 715 processes each fine raster transaction within the set 710 until all such transactions have been processed. In doing so, the tile engine 715 may recirculate transactions, or portions thereof, and/or include transactions, or portions thereof, in the TC tile 725 being generated, as discussed. When the TC tile 725 is complete, the tile engine 715 transmits that tile to PROP 420, in the manner discussed in conjunction with FIG. 5. The tile engine 715 may determine that the TC tile 725 is complete when that tile includes a threshold number of coverage samples. Alternatively, the tile engine 715 may determine that the TC tile 725 is complete when all fine raster transactions in the set 710 have been processed. When the TC tile 725 is complete, then the tile engine 715 may receive additional fine raster transactions into bin 705 for processing in conjunction with the generation of a new TC tile 725. The tile engine 715 also resets the tile mask 720 to include all zeros when generation of the new TC tile 725 begins.

Persons skilled in the art will understand that the various embodiments discussed herein may be individually or collectively applicable for a wide variety of different system-wide configurations. For example, the above techniques may be applicable when processing coverage at pixel-level granularity or sample-level granularity. Further, some techniques are appropriate for configurations that permit the division of fine raster transactions across quad boundaries, whereas others are relevant only to those that do not. The different techniques described specifically above are also described, in stepwise fashion, below in conjunction with FIG. 9.

Figure 9:
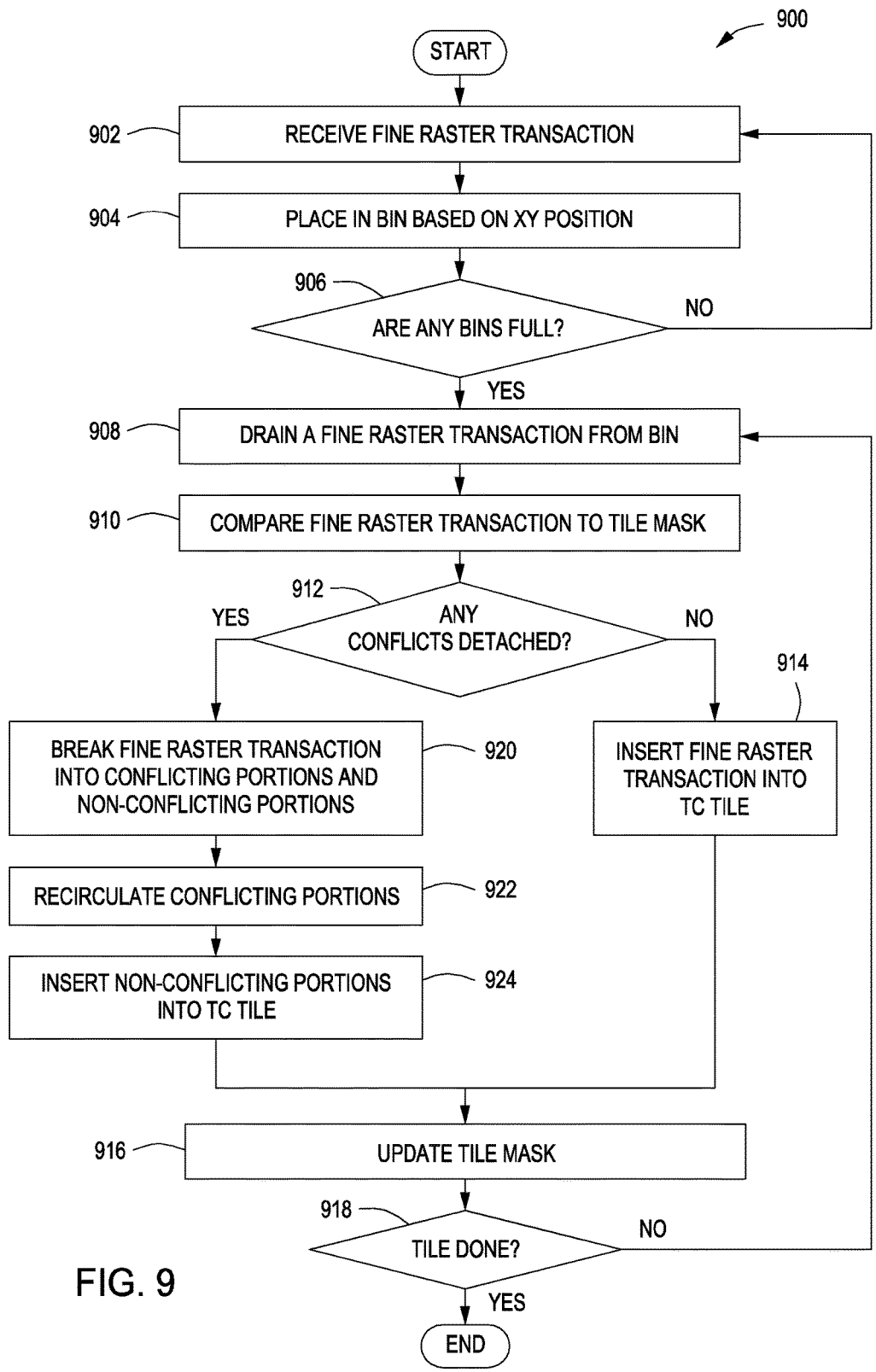
FIG. 9 is flow diagram of method steps for generating a tile coalescer (TC) tile, according to one embodiment of the present invention.

FIG. 9 is flow diagram of method steps for generating a tile coalescer (TC) tile, according to one embodiment of the present invention. Although the method steps are described in conjunction with the systems of FIGS. 1-8, persons skilled in the art will understand that any system configured to perform the method steps, in any order, is within the scope of the present invention.

As shown, a method 900 begins at step 902, where tile coalescer 515 receives a fine raster transaction. The fine raster transaction could be, for example, fine raster transaction 600 shown in FIG. 6. The fine raster transaction received at step 902 is generally associated with a specific XY position of the screen space. At step 904, the tile coalescer places the fine raster transaction in a particular bin 705 based on the XY position of that transaction. Each bin 705 buffers fine raster transactions associated with a region of screen space that is generally larger than the size of a fine raster transaction.

At step 906, the tile engines 715 within the tile coalescer 515 determine whether any bins are full. If no bins are full, then the method 900 returns to step 902. Otherwise, if a bin 705 is full, then the method 900 proceeds to step 908. At step 908, the tile engine 715 associated with the full bin drains a fine raster transaction from the bin 705. At step 910, the tile engine 715 compares the fine raster transaction to the tile mask 720. The tile mask 720 indicates whether the TC tile 725 currently being generated already includes coverage samples associated with various XY positions of the screen space.

At step 912, the tile engine 715 determines whether any conflicts are detected. A conflict may occur when the tile mask 720 indicates that the current TC tile 725 and the fine raster transaction both indicate coverage at the same XY positions. If no conflicts are detected at step 912, then the method 900 proceeds to step 914 and the fine raster transaction is included in the TC tile 725. Then, at step 916, the tile engine 715 updates the tile mask 720 to reflect the included fine raster transaction. In doing so, the tile engine 715 may perform an OR operation between the tile mask 720 and the fine raster transaction.

Returning now to step 912, if conflicts were, in fact, detected, then the method 900 proceeds to step 920. At step 920, the tile engine 715 divides the fine raster transaction into conflicting coverage samples and non-conflicting coverage samples. At step 922, the tile engine 715 recirculates the conflicting coverage samples by returning those coverage samples, within a newly created fine raster transaction, to bin 705. At step 924, the tile engine 715 includes the non-conflicting coverage samples, in the form of another new fine raster transaction, in the TC tile 725. At step 916, the tile engine 715 then updates the tile mask 720. In one embodiment, the tile engine 715 updates the tile mask 720 to reflect the non-conflicting coverage samples inserted into the TC tile 725 at step 924. In another embodiment, the tile engine 715 updates the tile mask 720 to reflect the non-conflicting coverage samples as well as the recirculated, conflicting coverage samples. In either embodiment, the tile engine 715 performs an OR operation between the tile mask 720 and the relevant fine raster transactions.

At step 918, the tile engine 715 determines whether the TC tile 725 is done. The tile engine 715 may rely on the tile mask 729 to make this determination, or may determine TC tile completion when all fine raster transactions in the bin 705 have been processed. If the TC tile 725 is not done, then the method 900 return to step 908. Otherwise, the tile engine 715 transmits the finished TC tile to PROP 520, and the method 900 ends.

By implementing the method 900 repeatedly, the tile coalescer 715 may generate a plurality of TC tiles 725. The various ROP units shown in FIG. 5, including PROP 520, ZROP 525, and CROP 530, may process those tiles. Then, GPMSD 535 assigns a plurality of thread groups to each TC tile 725 and then distributes the thread groups across SMs 310. GPMSD 535 configures each plurality of thread groups according to a technique that preserves the API ordering of the graphics primitives associated with the TC tiles, as described in greater detail below in conjunction with FIGS. 10-14.

Distributing the Processing of TC Tiles to SMs

Figure 10A:
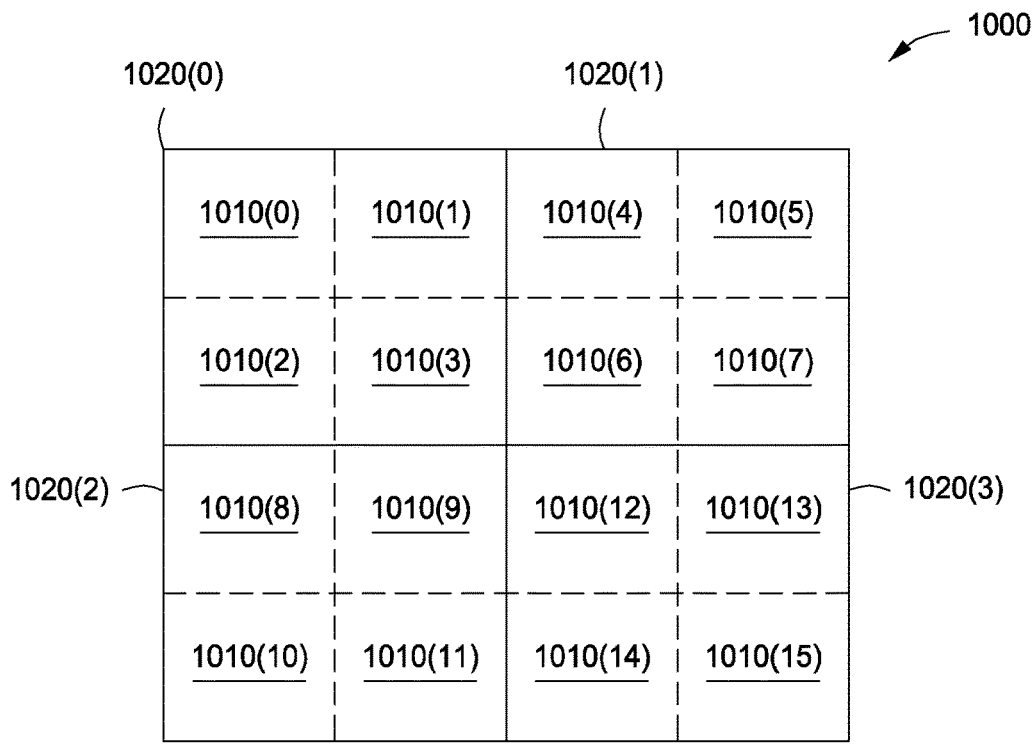
FIGS. 10A-10B are conceptual illustrations of a screen space that includes a collection of TC tiles organized into different regions, according to one embodiment of the present invention.
Figure 10B:
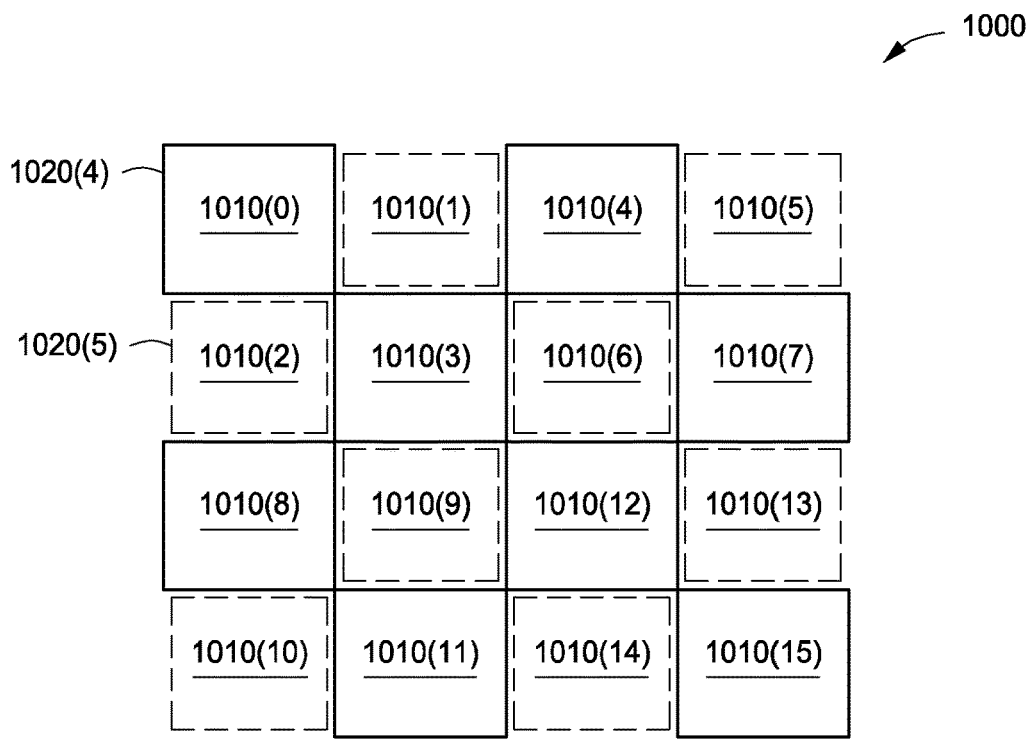

FIGS. 10A-10B are conceptual illustrations of a screen space that includes a collection of TC tiles organized into different regions, according to one embodiment of the present invention. As shown in FIG. 10A, screen space 1000 includes TC tile locations 1010. Each TC tile location 1010 represents a collection of XY positions that may be associated with one or more TC tiles 725. Accordingly, multiple different TC tiles 725 may be associated with a single TC tile location 1010. In one embodiment, each TC tile location 1010 is a 16×16 array of pixels or samples within screen space 1000. As discussed above, the API ordering of TC tiles that include coverage associated with the same set of XY positions should be preserved in order to permit programmable blending operations.

To support this functionality, GPMSD 535 coordinates the processing of the TC tiles 725 associated with each different TC tile location 1010 to occur in API order. In doing so, GPMSD 535 groups neighboring TC tile locations 1010 into TC tile regions 1020, as is shown. GPMSD 535 then assigns a different ticket dispenser to each such region. The ticket dispenser for a given region 1020 issues unique tickets, in API order, for each TC tile 725 located in that region. The thread groups associated with the various TC tiles 725 within each region 1020 then execute in ticket order, which preserves API order.

FIG. 10B illustrates an alternative distribution of TC tiles organized into interleaved regions 1020(4) and 1020(5), according to one embodiment of the present invention. As shown, regions 1020(4) and 1020(5) include TC tile locations 1010, similar to FIG. 10A, although each of those regions 1020 includes non-contiguous TC tile locations 1010. The configuration shown in FIG. 10B may distribute the usage of ticket dispensers across many ticket dispensers. Further, this configuration may increase the chance that processing involving nearby TC tile locations 1010 serializes on different ticket dispensers.

Persons skilled in the art will recognize that regions 1020 may include any number of TC tile locations 1010. For example, screen space 1000 could include just one region 1020 that encompasses all TC tile locations 1010. In this example, GPMSD 535 would assign one ticket dispenser to issue unique tickets for all TC tiles 735. However, this approach might not be practical because the one ticket dispenser could potential be quite large. Alternatively, screen space 100 may include a number of regions 1020 equal to the number of TC tile locations 1000, meaning that each TC tile location 1010 is assigned a different ticket dispenser. This approach might also be impractical because a large number of ticket dispensers could be needed. In practice, each TC tile region 1020 should include just enough TC tile locations that API order is preserved for each TC tile location, without consuming excessive resources. An exemplary ticket dispenser is discussed below in conjunction with FIG. 11.

Figure 11:
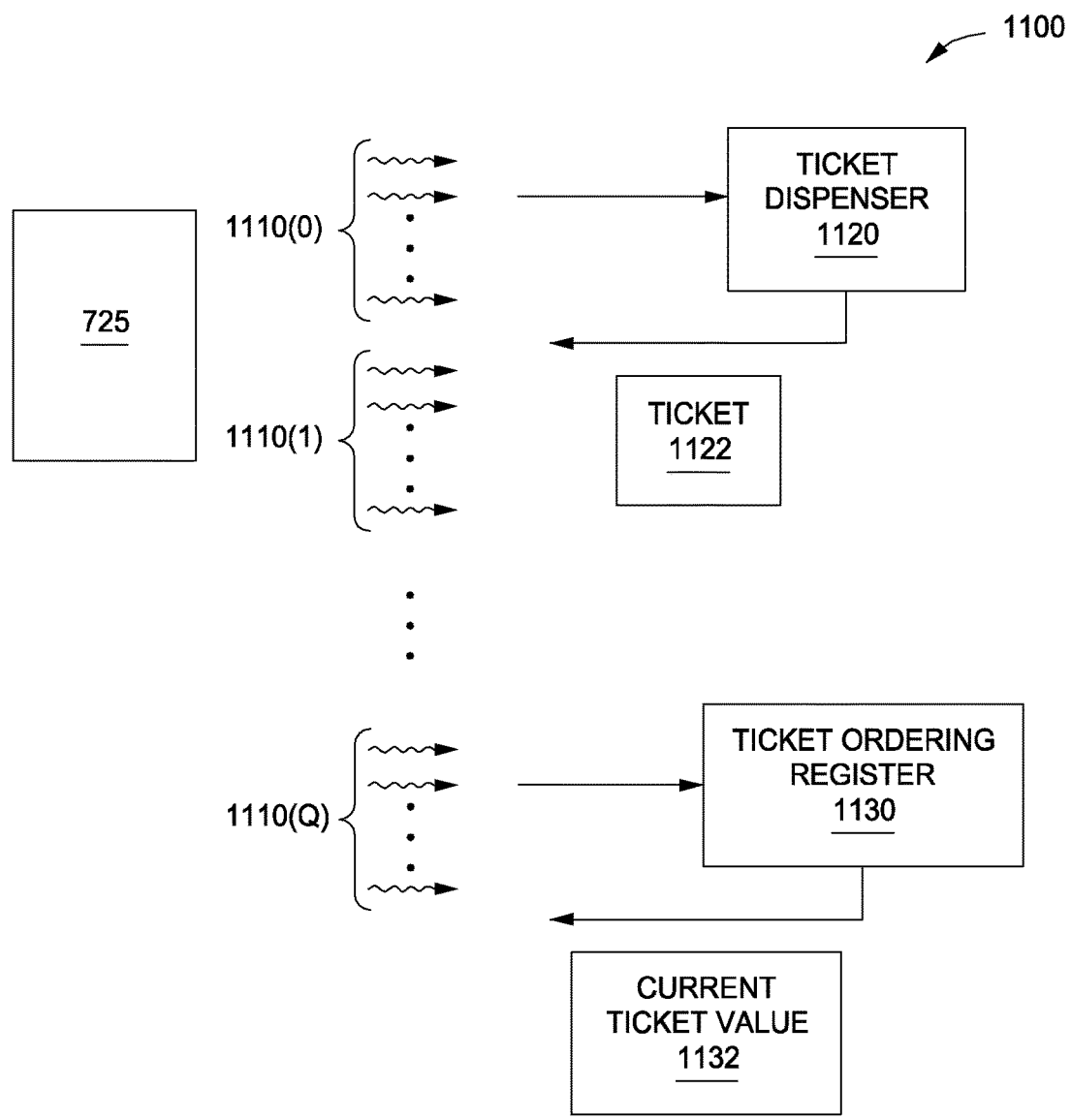
FIG. 11 is a conceptual illustration of ordering hardware within the Graphics Pipe Manager Subtile Distributor (GPMSD) of FIG. 5 that is configured to coordinate the processing of TC tiles, according to one embodiment of the present invention.

FIG. 11 is a conceptual illustration of ordering hardware configured to coordinate the processing of TC tiles, according to one embodiment of the present invention. As shown, ordering hardware 1100 includes a ticket dispenser 1120 and a ticket ordering register 1130. Ordering hardware 1100 may reside in GPMSD 535, memory, or elsewhere within PPU 202. Generally, different TC tile regions 1020 of screen space 1000 may be associated with different instances of ordering hardware 1100. Each such instance coordinates the processing of TC tiles 725 falling within the corresponding TC tile region 1020.

As also shown, a TC tile 725 is associated with a plurality of thread groups 1110. GPMSD 535 is configured to assign thread groups 1110 for processing TC tile 725. Each such thread group 1110 may execute across any of SMs 310. However, GPMSD 535 coordinates the execution of those different thread groups to respect the API order associated with TC tile 725. In doing so, GPMSD 535 causes a selected thread from a thread group 1110 to perform various steps, outlined below, to initiate the processing of the TC tile 725 at a time that does not disrupt API order. In one embodiment, the selected thread is the highest numbered, active, non-helper thread within thread groups 1110.

To initiate the processing of the TC tile 725, the selected thread first hashes the XY position of the TC tile 725 to generate a ticket dispenser ID. In one embodiment, the selected thread parses the most significant bits (MSBs) of the TC tile XY position to generate the ticket dispenser ID. The selected thread then acquires a ticket 1122 from ticket dispenser 1120. In response, ticket dispenser 1120 increments. Ticket dispenser 1120 is generally sized to support the maximum number of thread groups within the GPC 208. Ticket 1122 is described in greater detail below in FIG. 12.

Figure 12:
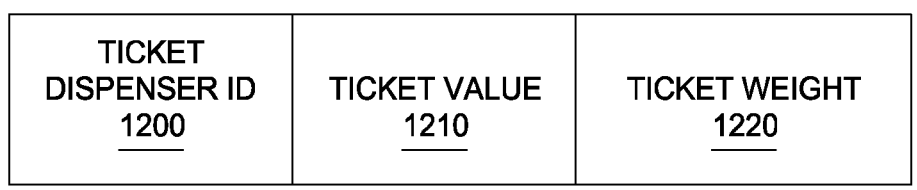
FIG. 12 is a more detailed illustration of the ticket of FIG. 11, according to one embodiment of the present invention.

FIG. 12 is a more detailed illustration of the ticket of FIG. 11, according to one embodiment of the present invention. As shown ticket 1122 includes ticket dispenser ID 1200, ticket value 1210, and ticket weight 1220. Ticket dispenser ID 1200 indicates the location of ticket dispenser 1120 in memory. Ticket value 1210 is a 16-bit value. Ticket weight 1220 includes a value that is added to ticket ordering register 1130 when the processing of TC tile 725 is complete, as described in greater detail below.

Referring back now to FIG. 11, ticket ordering register 1130 is a counter that indicates the ticket value of the TC tile 725 that is currently eligible to be processed. Once the selected thread acquires ticket 1122, the selected thread then iteratively reads ticket ordering register 1130 to acquire the current ticket value 1132. When the current ticket value 1132 is equivalent to the value of ticket 1122, then thread groups 1110 are permitted to initiate execution. Again, thread groups 1110 may execute across any of SMs 310. However, since those thread groups execute according to ticket order, and tickets are issued for TC tiles 725 in API order, those thread groups therefore also execute in API order.

When the selected thread determines that the processing of the TC tile 725 may commence, the selected thread causes each thread group 1110 to acquire a thread group weight. Each thread group 1110 associated with the TC tile 725 acquires a weight of one, except for the last thread group 1110. The last thread group acquires a thread group weight equal to R–Q, where R is an overflow value associated with a weight counter within ticket ordering register 1130, and Q is the number of other thread groups 1110 associated with the TC tile 725. Ticket ordering register 1130 is described in greater detail below in conjunction with FIG. 13.

Figure 13:
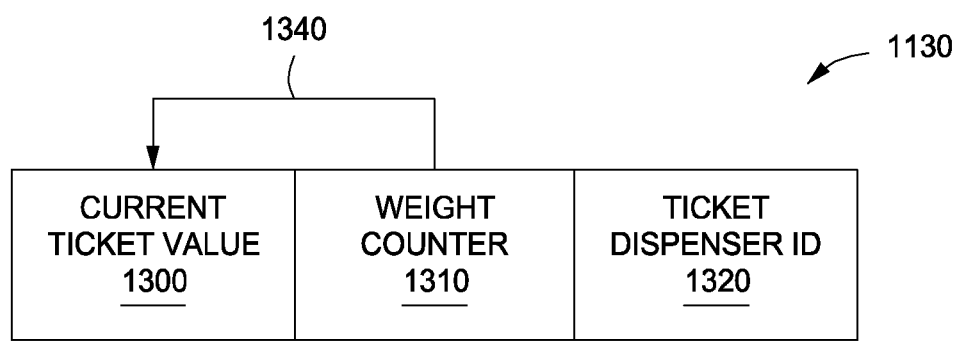
FIG. 13 is a more detailed illustration of the ticket ordering register of FIG. 11, according to one embodiment of the present invention.

FIG. 13 is a more detailed illustration of the ticket ordering register of FIG. 11, according to one embodiment of the present invention. As shown, ticket ordering register 1130 includes a current ticket value 1300, and a weight counter 1310, and a ticker dispenser ID 1320. Current ticket value 1300 indicates the ticket value of the TC tile 725 that is currently eligible for processing. Weight counter 1310 is configured to track thread group weights of thread groups 1110, as mentioned above. Ticket dispenser ID 1320 indicates the location of ticket dispenser 1120 in memory.

As each thread group 1110 finishes processing and exits, those thread groups 1110 add the assigned thread group weight to weight counter 1320. When all such thread groups have exited and added the respective thread group weights, the total value added to that counter is equal to R, the overflow value associated with weight counter 1320. R may simply be the maximum value supported by weight counter 1320. In one embodiment, weight counter 1320 is a 7-bit counter, and R is equal to 128. When R is added to weight counter 1320, carryout 1340 occurs, and current ticket value 1310 increments.

The motivation for accumulating weights in this fashion is that the thread groups 1110 associated with the TC tile 725 may execute on different SMs 310 and in different orders. However, when all those thread groups are complete, the current ticket value maintained by ticket ordering register 1330 needs to be updated. Accumulating the thread group weights when each thread group 1110 completes in the manner discussed above accomplishes this goal, without requiring that the thread groups 1110 exit in any particular order.

By implementing the approach described above in conjunction with FIGS. 10-13, GPMSD 535 is capable of causing the different thread groups assigned to process each different TC tile 725 to execute according to the API order of those TC tiles. Thus, when SMs 310 execute thread groups 1110 for a given TC tile, those thread groups can perform blending operations that call for API order to be preserved. The technique described above is also described below in stepwise fashion in FIG. 14.

Figure 14:
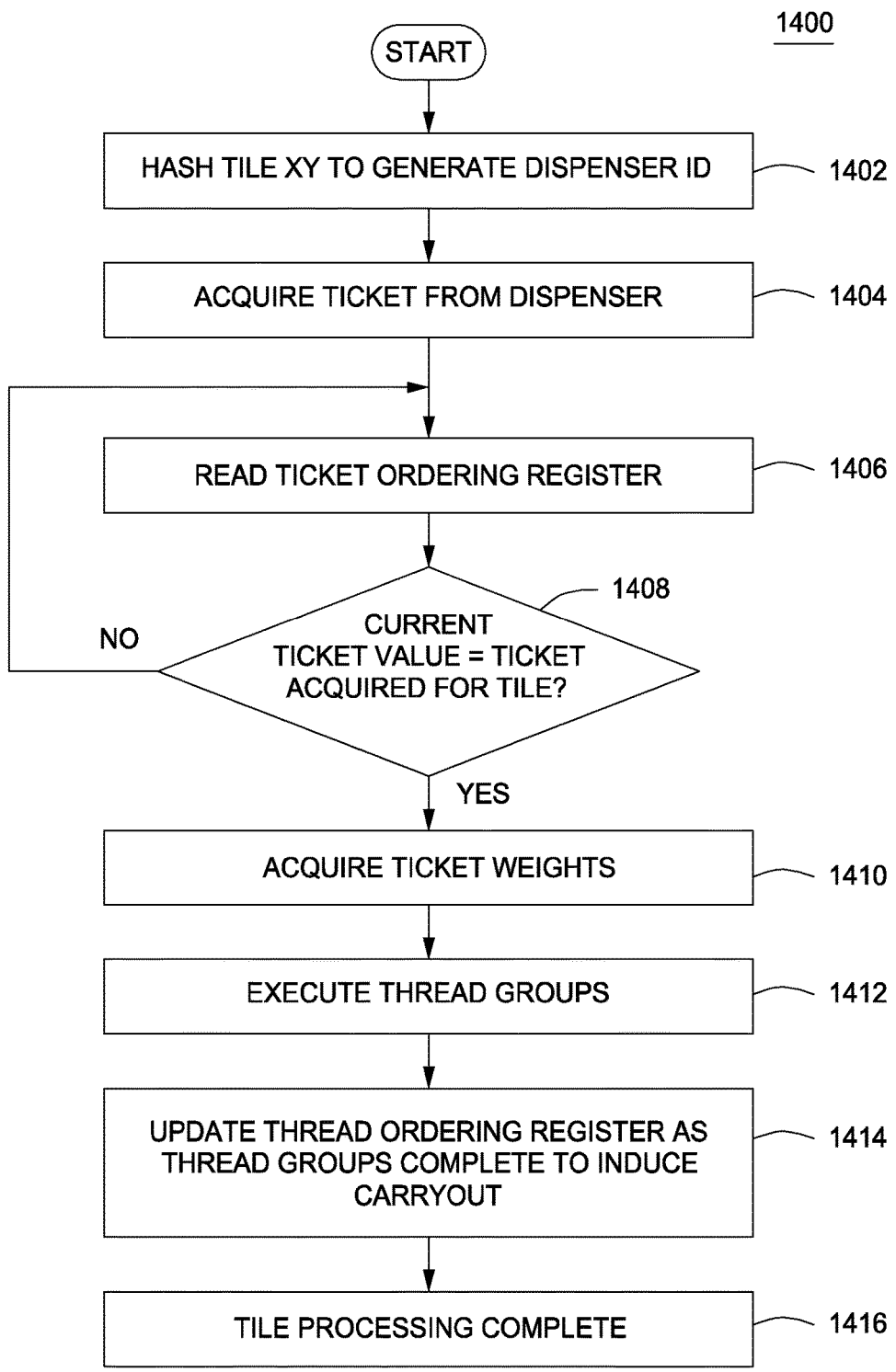
FIG. 14 is a flow diagram of method steps for processing a TC tile based on API order, according to one embodiment of the present invention.

FIG. 14 is a flow diagram of method steps for processing a TC tile based on API order, according to one embodiment of the present invention. Although the method steps are described in conjunction with the systems of FIGS. 1-8 and 10-13, persons skilled in the art will understand that any system configured to perform the method steps, in any order, is within the scope of the present invention.

As shown, a method 1400 begins at step 1402, where a selected thread, in the thread groups assigned to process a TC tile 725, hashes an XY position associated with the TC tile 725 to generate a ticket dispenser ID. The ticket dispenser ID could indicate the location of ticket dispenser 1120 in memory, for example. At step 1404, the selected thread acquires a ticket from the ticket dispenser. The ticket could be, for example, ticket 1122 shown in FIG. 11.

At step 1406, the selected thread reads the current ticket value from a ticket ordering register. The ticket acquired at step 1404 indicates the ticket ordering register. The ticket ordering register could be ticket ordering register 1130 shown in FIG. 11. At step 1408, the selected thread determines whether the current ticket value read from the ticket ordering register is equivalent to the value of the ticket acquired at step 1404. If the values are not equivalent, the method 1400 returns to step 1406. Otherwise, the method 1400 proceeds to step 1410.

At step 1410, each thread group associated with the TC tile 725 acquires a thread group weight. Each thread group 1110 associated with the TC tile 725 acquires a weight of one, except for the last thread group 1110. The last thread group acquires a thread group weight equal to R−Q, where R is an overflow value associated with a weight counter within ticket ordering register 1130, and Q is the number of other thread groups 1110 associated with the TC tile 725.

At step 1412, the selected thread causes the thread groups to execute, thereby processing the TC tile 725. At step 1414, each thread that finishes processing and exits updates the ticket ordering register with the assigned weight value. When all such threads update the ticket ordering register, a carryout is triggered and the ticket ordering register increments. At step 1416, when all threads are complete, the TC tile is finished processing. The method 1400 then ends.

Figure 15:
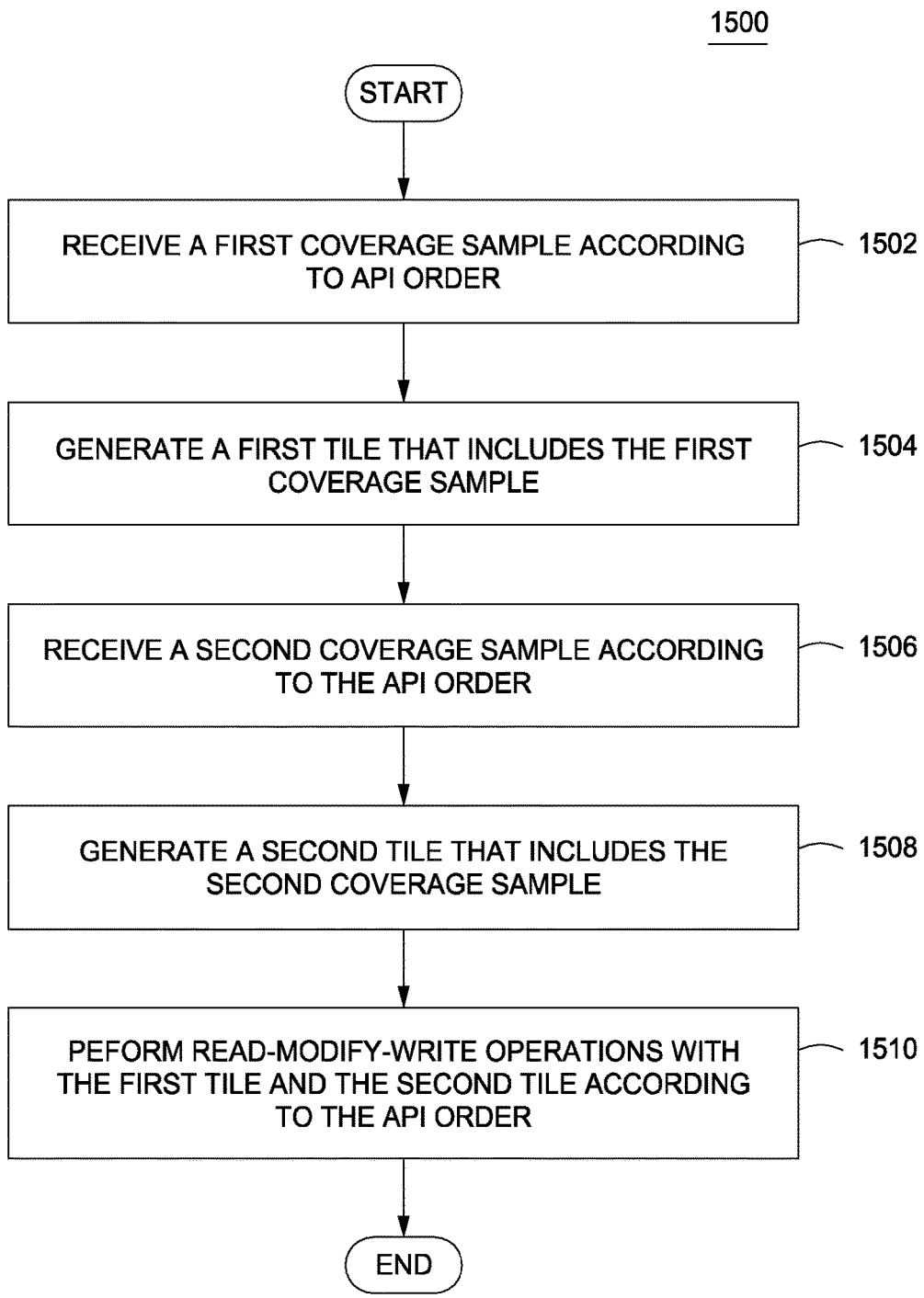
FIG. 15 is a flow diagram of method steps for executing read-modify-write operations with coverage data in API order, according to one embodiment of the present invention.

The method 1400 may be practiced in conjunction with the method 900 described above in conjunction with FIG. 9, thereby preserving API order while permitting programmable operations to be executed on SMs 310. Those operations may include read-modify-write operations associated with various programmable blending modes. Each SM 310 may include one or more load-store units and one or more corresponding execution units configured to implement the aforementioned read-modify-write operations. FIG. 15, described below, sets forth an overarching approach for performing read-modify-write operations while maintaining API order.

FIG. 15 is a flow diagram of method steps for executing read-modify-write operations with coverage data in API order, according to one embodiment of the present invention. Although the method steps are described in conjunction with the systems and methods of FIGS. 1-14, persons skilled in the art will understand that any system configured to perform the method steps, in any order, is within the scope of the present invention.

As shown, a method 1500 begins at step 1502, where tile coalescer 515 within graphics processing pipeline 350 receives a first coverage sample according to API order. The coverage sample received at step 1502 is generally associated with a particular XY location within a pixel or with a pixel as a whole. At step 1504, tile coalescer 515 generates a first TC tile that includes the first coverage sample.

At step 1502, tile coalescer 515 within graphics processing pipeline 350 receives a second coverage sample according to the API order. The coverage sample received at step 1504 may be associated with the particular XY location associated with the first coverage sample, or may be associated with a different XY location. The second coverage sample may reside within a pixel or be associated with a pixel as a whole. At step 1508, tile coalescer 515 generates a second TC tile that includes the second coverage sample. In performing steps 1502 through 1504, tile coalescer 515 generally performs the functionality described above in conjunction with FIGS. 5-9.

At step 1510, GPMSD 535 within graphics processing pipeline 350 causes one or more SMs 310 to perform read-modify-write operations with the first tile and the second tile according to the API order associated with the first and second coverage samples. In doing so, GPMSD 535 performs various scheduling operations with the first and second tiles, as described above in conjunction with FIGS. 10-14. The method 1500 then ends. In one embodiment, device driver 103 performs the method 1500 by configuring the graphics processing pipeline 350 to perform steps 1502 through 1510.

In sum, a tile coalescer within a graphics processing pipeline coalesces coverage data into tiles. The coverage data indicates, for a set of XY positions, whether a graphics primitive covers those XY positions. The tile indicates, for a larger set of XY positions, whether one or more graphics primitives cover those XY positions. The tile coalescer includes coverage data in the tile only once for each XY position, thereby allowing the API ordering of the graphics primitives covering each XY position to be preserved. The tile is then distributed to a set of streaming multiprocessors for shading and blending operations. The different streaming multiprocessors execute thread groups to process the tile. In doing so, those thread groups may perform atomic read-modify-write operations with data stored in memory. Each such thread group is scheduled to execute at a time that preserves the API order of the associated graphics primitives.

Advantageously, the graphics processing pipeline can be configured to perform operations that rely on atomicity and API order, such as blending operations. Thus, the graphics processing pipeline need not be limited by fixed-function blending hardware. Further, since the streaming multiprocessors allow read-modify-write operations to be performed, those multiprocessors can be configured to perform more complex blending operations than possible with fixed-function blending implementations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A graphics subsystem configured to generate tiles of coverage samples, the subsystem comprising:
   a first bin buffer that collects arrays of coverage samples associated with a first range of X-Y values; and
   a tile engine that is coupled to the first bin buffer and:
      drains a first array of coverage samples from the first bin buffer,
      compares the first array of coverage samples to a tile mask to determine that a first tile does not yet include a coverage sample at a first X-Y position, and
      inserts a first coverage sample included in the first array of coverage samples into the first tile.

2. The graphics subsystem of claim 1, wherein the tile engine inserts the first coverage sample into the first tile by:
   generating a second array of coverage samples that includes the first coverage sample; and
   inserting the second array of coverage samples into the first tile.

3. The graphics subsystem of claim 1, wherein the tile engine further updates the tile mask to indicate that the tile mask includes the first coverage sample at the first X-Y position.

4. The graphics subsystem of claim 1, wherein the tile engine further:
   compares the first array of coverage samples to the tile mask to determine that the first tile already includes a coverage sample at a second X-Y position; and
   re-circulates a second coverage sample included in the first array of coverage samples.

5. The graphics subsystem of claim 4, wherein the tile engine re-circulates the second coverage sample by:
   generating a second array of coverage samples that includes the second coverage sample; and
   placing the second array of coverage samples into the first bin buffer for processing in conjunction with a subsequent tile.

6. The graphics subsystem of claim 4, wherein the tile engine further updates the tile mask to indicate that the second coverage sample was recirculated.

7. The graphics subsystem of claim 4, wherein the first coverage sample is associated with a first quad of pixels or samples, and the second coverage sample is associated with a second quad of pixels or samples.

8. The graphics subsystem of claim 4, wherein the first coverage sample is associated with a first pixel or sample, the second coverage sample is associated with a second pixel or sample, and the first pixel or sample resides adjacent to the second pixel or sample.

9. The graphics subsystem of claim 1, wherein the first range of X-Y values comprises an X-Y range of screen space, and the first array of coverage samples has X-Y dimensions that are less than the first range of X-Y values.

10. The graphics subsystem of claim 1, wherein the tile engine further generates a second tile that includes a second coverage sample at the first X-Y position, wherein the first coverage sample appears before the second coverage sample in an application programming interface order.

11. The graphics subsystem of claim 10, wherein the tile engine further:
    issues the first tile to a downstream unit, wherein the downstream unit is executed by a parallel processor; and
    issues the second tile to the downstream unit, wherein the downstream unit receives the first tile and the second tile in the application programming interface order associated with coverage samples.

12. The graphics subsystem of claim 11, wherein the downstream unit:
    assigns a first thread group to perform one or more programmable blending operations with the first tile; and
    assigns a second thread group to perform the one or more programmable blending operations with the second tile,
    wherein the first thread group and the second thread group perform the one or more programmable blending operations according to the application programming interface order.

13. A computer-implemented method for generating tiles of coverage samples, the method comprising:
    collecting arrays of coverage samples associated with a first range of X-Y values into a first bin;
    draining a first array of coverage samples from the first bin;
    comparing the first array of coverage samples to a tile mask to determine that a first tile does not yet include a coverage sample at a first X-Y position; and
    inserting a first coverage sample included in the first array of coverage samples into the first tile.

14. The computer-implemented method of claim 13, wherein inserting the first coverage sample into the first tile comprises:
generating a second array of coverage samples that includes the first coverage sample; and
inserting the second array of coverage samples into the first tile.

15. The computer-implemented method of claim 13, further comprising:
comparing the first array of coverage samples to the tile mask to determine that the first tile already includes a coverage sample at a second X-Y position; and
re-circulating a second coverage sample included in the first array of coverage samples.

16. The computer-implemented method of claim 15, wherein re-circulating the second coverage sample comprises:
generating a second array of coverage samples that includes the second coverage sample; and
placing the second array of coverage samples into the first bin for processing in conjunction with a subsequent tile.

17. The computer-implemented method of claim 16, wherein the first tile and the subsequent tile are processed in an application programming interface order associated with the first coverage sample and the second coverage sample.

18. A computing device, comprising:
a raster unit that generates coverage samples, wherein the raster unit is executed by a parallel processor; and
a graphics subsystem, including:
a first bin buffer that collects arrays of coverage samples associated with a first range of X-Y values, and
a tile engine that is coupled to the first bin buffer and:
drains a first array of coverage samples from the first bin buffer,
compares the first array of coverage samples to a tile mask to determine that a first tile does not yet include a coverage sample at a first X-Y position, and
inserts a first coverage sample included in the first array of coverage samples into the first tile.

19. The computing device of claim 18, wherein the tile engine inserts the first coverage sample into the first tile by:
generating a second array of coverage samples that includes the first coverage sample; and
inserting the second array of coverage samples into the first tile.

20. The computing device of claim 18, wherein the tile engine further:
compares the first array of coverage samples to the tile mask to determine that the first tile already includes a coverage sample at a second X-Y position; and
re-circulates a second coverage sample included in the first array of coverage samples.

21. The computing device of claim 18, further comprising:
a thread management unit that:
receives the first tile, and
receives a second tile that includes a second coverage sample, wherein the thread management unit is executed by a parallel processor,
wherein the thread management unit receives the first tile and the second tile in an application programming interface order associated with the first coverage sample and the second coverage sample.

22. The computing device of claim 21, wherein the thread management unit:
assigns a first thread group to perform one or more programmable blending operations with the first tile; and
assigns a second thread group to perform the one or more programmable blending operations with the second tile,
wherein the first thread group and the second thread group perform the one or more programmable blending operations according to the application programming interface order associated with the first coverage sample and the second coverage sample.

* * * * *